United States Patent [19]

Hauslein

[11] 4,169,978
[45] Oct. 2, 1979

[54] TEMPERATURE CONTROL DEVICE FOR A COFFEE OR TEA MAKER

[75] Inventor: Reinhard Hauslein, Minden, Fed. Rep. of Germany

[73] Assignee: Melitta-Werke Bentz & Sohn KG, Minden, Fed. Rep. of Germany

[21] Appl. No.: 821,960

[22] Filed: Aug. 4, 1977

[30] Foreign Application Priority Data

Aug. 4, 1976 [DE] Fed. Rep. of Germany ....... 2635046

[51] Int. Cl.² .................. H05B 1/02; A47J 31/56; F24H 1/10
[52] U.S. Cl. ...................................... 219/297; 99/281; 99/288; 99/307; 219/308; 219/323; 219/328; 219/511; 222/146 HE
[58] Field of Search ................. 219/296–309, 219/327–331, 337, 323, 511; 137/337, 341; 222/146 HE; 236/20 R, 32, 33; 99/280–283, 288, 306, 307; 126/351, 374; 122/4 A, 13 A

[56] References Cited

U.S. PATENT DOCUMENTS

| 1,532,903 | 4/1925 | Kercher | 219/328 X |
| 3,178,557 | 4/1965 | Umann | 219/331 UX |
| 3,254,796 | 6/1966 | Wright | 219/330 |
| 4,039,771 | 8/1977 | Thorsoe et al. | 219/328 |

Primary Examiner—A. Bartis
Attorney, Agent, or Firm—Spencer & Kaye

[57] ABSTRACT

A coffee or tea maker has a freshwater receptacle which is connected with a continuous flow heater by a freshwater intake. Heated water leaves the continuous flow heater through a riser. The freshwater intake and the riser are coupled by a conduit in which cold freshwater and heated water admix and in which a thermostat switch is disposed. The latter controls the energization of the heater as a function of the temperature changes of the water mixture in the conduit. An additional heating means arranged in heat exchange relationship with the thermostat switch maintains the heater in a deenergized state after completion of the brewing process. An adjustable throttle valve may be provided for regulating the admission of fresh water into the conduit.

4 Claims, 2 Drawing Figures

TEMPERATURE CONTROL DEVICE FOR A COFFEE OR TEA MAKER

BACKGROUND OF THE INVENTION

This invention relates to a coffee or tea maker having a freshwater receptacle and a continuous flow heater which is arranged underneath the freshwater receptacle and which is connected therewith by a freshwater intake. The continuous flow heater has an outlet which continues in a riser for the heated water. The continuous flow heater is automatically controlled (energized and de-energized) by a switching arrangement.

Various devices are known for the automatic control of the continuous flow heater of coffee or tea makers.

One type of known control device—also designated as a level control—essentially comprises a pressure-responsive box having an integrated microswitch which turns the continuous flow heater on and off dependent upon the freshwater level.

The above-outlined known control is very accurate, because the control diaphragm of the pressure-responsive box responds in a very sensitive manner. Such a control device, however, is disadvantageous because it is relatively expensive and further, there is a significant risk of soiling the mechanically moved components because these, at least in part, directly contact the fresh water.

Another known control device for the continuous flow heater of a coffee or tea maker includes a so-called bimetal spring (thermostat) switch which, in the known tea or coffee makers is arranged directly at the continuous flow heater and responds to changes of the external temperature of the continuous flow heater. In the entirely switched-off state of the apparatus the bimetal switch is in its closed position, consequently, subsequent to filling the receptacle with fresh water and switching on the apparatus, the brewing process is promptly initiated. Upon reaching a predetermined maximum temperature, the bimetal switch opens and is closed only after the temperature has dropped under a predetermined magnitude.

A bimetal switch of the above-outlined type has the advantage of very low cost. Its use in devices known heretofore is, however, disadvantageous in that the continuous flow heater, because of its relatively large mass, transmits temperature changes only very slowly to the bimetal switch so that the latter very frequently is in its closed position for a much longer period than desirable for the proper functioning of the apparatus. As a result, the continuous flow heater is in an energized state for a relatively long period even at times when only a small volume of residual water dwells in the continuous flow heater.

SUMMARY OF THE INVENTION

It is an object of the invention to provide an improved coffee or tea maker of the above-outlined type in which temperature changes in the zone of the continuous flow heater are transmitted to the bimetal switch substantially without delay.

This object and others to become apparent as the specification progresses, are accomplished by the invention, according to which, briefly stated, the bimetal (thermostat) switch is disposed in a coupling conduit which directly connects the freshwater intake with the riser.

As long as fresh water is supplied from the freshwater receptacle to the continuous flow heater, a mixture of cold fresh water and heated hot water will be present in the coupling conduit. The temperature of the mixture is sufficiently low to maintain the bimetal switch closed. If the freshwater receptacle is emptied and thus no more fresh water is introduced into the coupling conduit, the temperature within the coupling conduit increases very rapidly, because only hot water is introduced thereinto from the riser. Consequently, the bimetal switch responds and thus opens, thereby de-energizing the continuous flow heater.

In accordance with a further feature of the invention, an additional heater is coupled to the bimetal switch. In the switched-on state of the apparatus, but after the brewing process, the additional heater maintains the bimetal switch at a temperature which prevents a continuous switching (on and off) of the bimetal switch.

In accordance with still another feature of the invention, an adjustable throttle valve is provided in the coupling conduit for regulating the admission of freshwater to the coupling conduit.

DESCRIPTION OF THE PREFERRED EMBODIMENTS

Figures 1, 1A:
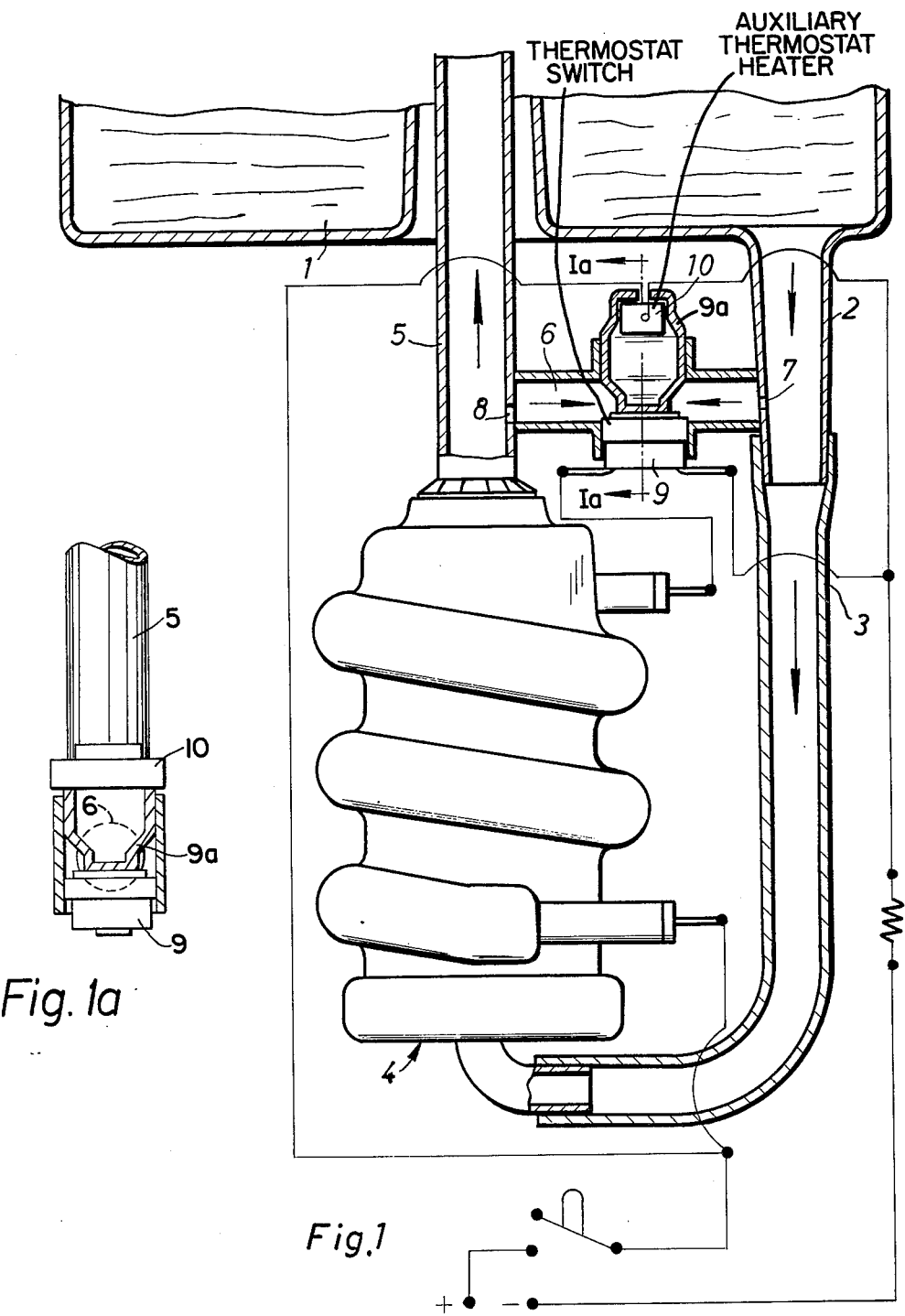
FIG. 1 is a longitudinal sectional view of one part of a coffee or tea maker, incorporating a preferred embodiment of the invention.
FIG. 1a is a sectional view taken along line Ia—Ia of FIG. 1.

Turning now to FIG. 1, there is shown the lower portion of a freshwater receptacle 1 which forms part of a coffee or tea maker and which has an integral outlet nipple 2 continuing in a conduit 3. The outlet nipple 2 and the conduit 3 constitute together a freshwater intake connecting the receptacle 1 with the inlet of a continuous flow heater 4.

The water heated in the continuous flow heater 4 is advanced to a filter device (not shown) through a riser 5 coupled to the outlet of the continuous flow heater 4. The outlet nipple 2 and the riser 5 are directly connected by a coupling conduit or pipe 6 bypassing the continuous flow heater 4. Within the outline of the coupling pipe 6, the outlet nipple 2 and the riser 5 are provided with respective apertures 7 and 8 so that fresh water, when supplied through the intake 2, 3 as well as heated water from the riser 5 may penetrate into the coupling pipe 6 and intermix therein by virtue of the flow-through arrangement in the coupling pipe 6 as illustrated in FIG. 1a. The latter supports a bimetal spring switch 9 of conventional structure which controls (that is, energizes and de-energizes) the circuit of the heater 4. The bimetal switch 9 projects with a heat-conducting metal component 9a into the coupling pipe 6 and thus responds to the temperature of the water present in the coupling pipe 6. During the brewing process, that is, during the period in which fresh water flows through the freshwater intake 2, 3 and thus also into the coupling pipe 6, the temperature in the coupling pipe 6 is at such a low value that the bimetal switch 9 maintains the continuous flow heater 4 in an energized state. In case the freshwater supply has been exhausted and thus the brewing process has been completed, only heated water is admitted from the riser 5 into the coupling pipe 6, so that within a very short period the temperature will rise to such a magnitude in the coupling pipe 6 that the bimetal switch 9 will respond (open) thus de-energizing the continuous flow heater 4.

In order to achieve that upon completion of the brewing process and subsequent to the de-energization of the continuous flow heater 4 by the switch 9 there is prevented a continuous on-switching and off-switching of the heater 4, an additional heater 10 is thermally coupled to the bimetal switch 9. The additional heater 10, which is connected in an electric circuit parallel with the heater 4 and the bimetal switch 9, maintains the bimetal switch 9 continuously at a temperature which prevents the bimetal switch 9 from again closing after completion of the brewing process (when the freshwater receptacle 1 is empty and therefore no cold water passes from the nipple 2 into the pipe 6 through the aperture 7) even after the coupling pipe 6 and any water remaining therein have cooled.

Figure 2:
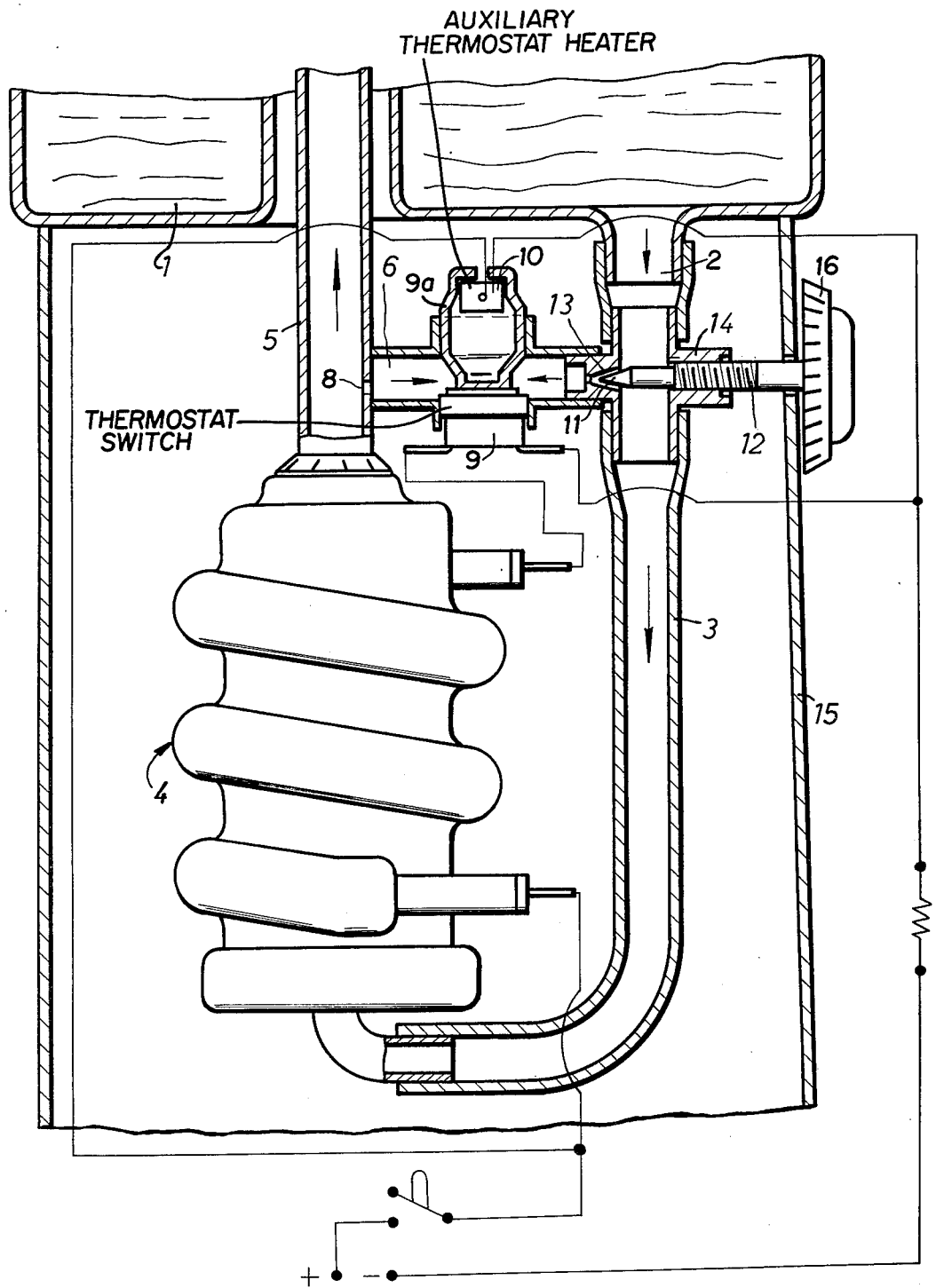
FIG. 2 is a longitudinal sectional view of one part of a coffee or tea maker incorporating another preferred embodiment of the invention.

In FIG. 2 there is illustrated a further embodiment of the invention which is characterized by the provision of an adjustable throttle valve arranged between the freshwater intake 2, 3 and the coupling pipe 6 for regulating the freshwater quantity admitted from the freshwater intake to the coupling pipe 6. The throttle valve is, in essence, formed of a threaded spindle 12 provided with a tip 11 at its frontal end as well as a housing 14 which is provided with a conical valve seat 13 and which receives the threaded spindle 12 and which further connects the freshwater intake 2, 3 with the coupling pipe 6. The threaded spindle 12 projects outwardly from the frontal wall 15 of a housing and is provided with a dial knob 16 providing for an accurate and metered introduction of freshwater quantities into the coupling pipe 6 by external setting. By means of metering the freshwater quantities introduced into the coupling pipe 6, the temperature of the brewing water driven upwardly in the riser 5 can be regulated, since, corresponding to the variable cold freshwater quantities admitted through the coupling pipe 6, a temperature change occurs in the riser 5 by virtue of mixing water quantities of different temperatures in the coupling pipe 6. Thus, if the freshwater quantities are increased by an appropriate setting of the throttle valve, the temperature of the heated water admitted from the riser 5 into the pipe 6 has to be higher to obtain the mixture temperature that triggers an opening of the switch 9. The reverse applies in case the freshwater quantities are reduced by the throttle valve. At the same time, however, a quantity regulation of the available brewing water takes place. It is noted that care has to be taken that the admitted freshwater quantity does not lead to an excessive temperature drop of the brewing water (for example, below 80° C.). At such a temperature or thereabelow, a brewing process for making filtered coffee is no longer possible or is impractical. It is to be understood that the possibilities of variations are strongly dependent from the output of the continuous flow heater 4.

It will be understood that the above description of the present invention is susceptible to various modifications, changes and adaptations, and the same are intended to be comprehended within the meaning and range of equivalents of the appended claims.

What is claimed is:

1. In a coffee or tea maker having a freshwater receptacle; a continuous flow heater including an electrically energized water heating means disposed below the receptacle and having an inlet and an outlet; a freshwater intake connecting the receptacle with the inlet of the continuous flow heater; a riser connected to the outlet of the continuous flow heater for guiding hot water exiting from the continuous flow heater; and a thermostat switch connected in the energizing circuit of the continuous flow heater for automatically energizing and de-energizing the water heating means of said continuous flow heater as a function of temperature; the improvement comprising conduit means defining a flow passage directly connecting said freshwater intake and said riser for receiving fresh water from said intake and heated water from said riser; said thermostat switch extending into said flow passage for responding to the temperature changes of the mixture of fresh water and heated water in said passage.

2. A coffee or tea maker as defined in claim 1, further comprising an additional heater connected in parallel with the heating means of said continuous flow heater and said thermostat switch and arranged in a heat exchange relationship with said thermostat switch for maintaining said thermostat switch in an open-circuit condition for thereby maintaining said water heating means of said continuous flow heater in a de-energized state after completion of the brewing process.

3. A coffee or tea maker as defined in claim 1, further comprising a settable throttle valve arranged to control the flow cross section between said intake and said flow passage.

4. A coffee or tea maker as defined in claim 3, wherein said settable throttle valve comprises a valve housing inserted in said intake and having a valve seat surrounding an opening forming part of said flow passage; a threaded spindle threadedly received in said valve housing and having a terminus cooperating with said valve seat for varying said flow cross section dependent upon the position of said threaded spindle with respect to said valve housing and an externally accessible, manually operable setting knob attached to said threaded spindle for rotating the same.

* * * * *